United States Patent
Ponukumati et al.

(10) Patent No.: US 9,385,775 B2
(45) Date of Patent: Jul. 5, 2016

(54) TEMPERATURE CONTROL AT POWER AMPLIFIER WITH TRANSCEIVER SWITCHING

(71) Applicant: QUALCOMM Incorporated, San Diego, CA (US)

(72) Inventors: Dhananjaya Sarma Ponukumati, Hyderabad (IN); Niranjan Kumar Vadlamudi, Hyderabad (IN); Subbarayudu Mutya, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 14/287,252

(22) Filed: May 27, 2014

(65) Prior Publication Data

US 2015/0349836 A1 Dec. 3, 2015

(51) Int. Cl.
| | |
|---|---|
| H04W 36/30 | (2009.01) |
| H04B 1/401 | (2015.01) |
| H04W 36/24 | (2009.01) |
| H04W 88/06 | (2009.01) |

(52) U.S. Cl.
CPC ............... *H04B 1/401* (2013.01); *H04W 36/24* (2013.01); *H04W 88/06* (2013.01)

(58) Field of Classification Search
CPC ............................... H04W 36/30; H04W 88/06
See application file for complete search history.

(56) References Cited

U.S. PATENT DOCUMENTS

| | | | |
|---|---|---|---|
| 7,068,985 B2 | 6/2006 | Quilisch et al. | |
| 7,206,567 B2 | 4/2007 | Jin et al. | |
| 8,244,296 B2 | 8/2012 | Dorsey et al. | |
| 8,588,696 B2 | 11/2013 | Gaikwad et al. | |
| 2008/0130728 A1* | 6/2008 | Burgan ............... | H04W 52/343 375/222 |
| 2011/0263212 A1 | 10/2011 | Yeh et al. | |
| 2013/0288610 A1* | 10/2013 | Toh ........................... | H03F 3/24 455/67.14 |
| 2014/0028402 A1* | 1/2014 | An ......................... | H03F 1/0244 330/296 |
| 2014/0039838 A1* | 2/2014 | Katz ........................ | G01R 1/04 702/188 |
| 2014/0199952 A1* | 7/2014 | Sandhu .................... | H03F 1/303 455/91 |

\* cited by examiner

*Primary Examiner* — Bobbak Safaipour
(74) *Attorney, Agent, or Firm* — Procopio, Cory, Hargreaves & Savitch LLP (57) ABSTRACT

A wireless communication device includes: a first communications unit configured to communicate with a first communication network; a second communications unit configured to communicate with a second communication network; a control unit configured to control operation of the wireless communication device; and one or more temperature sensors configured to sense operating temperatures of the first communications unit and the second communications unit and provide temperature signals to the control unit. In response to a determination that an operating temperature of the first communications unit conducting a first call exceeds a predetermined threshold temperature and an operating temperature of the second communications unit does not exceed the predetermined threshold temperature, the control unit is configured to cause the first call on the first communications unit to be switched from a first transceiver chain in the first communications unit to a second transceiver chain in the second communications unit.

27 Claims, 4 Drawing Sheets

TEMPERATURE CONTROL AT POWER AMPLIFIER WITH TRANSCEIVER SWITCHING

BACKGROUND

High signal path loss between a base station (BS) and a wireless communication device causes the wireless communication device to transmit at a high power level. High power transmission levels results in a temperature rise at the power amplifier of the wireless communication device. At high power, the power amplifier is less efficient. Also, the increased temperature can affect the performance of the wireless communication device, for example, power amplifier linearity may be degraded causing signal distortion. Further, the user may experience an uncomfortable increase in temperature of the wireless communication device.

Conventionally, the rise in temperature of the wireless communication device resulting from high power transmission levels is mitigated by reducing the maximum transmit power limit (MTPL). However, reducing the MTPL can affect the link quality and increase the call drop rates.

SUMMARY

Apparatuses and methods for controlling power amplifier temperature by switching transceiver chains in a Dual-SIM, Dual-Active (DSDA) wireless communication device are provided.

According to various embodiments of the disclosure there is provided a wireless communication device. The wireless communication device may include: a first communications unit configured to communicate with a first communication network; a second communications unit configured to communicate with a second communication network; a control unit configured to control operation of the wireless communication device; and one or more temperature sensors configured to sense operating temperatures of the first communications unit and the second communications unit and provide temperature signals to the control unit.

In response to a determination that an operating temperature of the first communications unit conducting a first call in process exceeds a predetermined threshold temperature and an operating temperature of the second communications unit does not exceed the predetermined threshold temperature, the control unit is configured to cause the first call in process on the first communications unit to be switched from a first transceiver chain in the first communications unit to a second transceiver chain in the second communications unit.

According to various embodiments there is provided a method for mitigating temperature rise in a wireless communication device. The method may include: detecting an operating temperature of a first communications unit conducting a first call in process; comparing the operating temperature of the first communications unit to a predetermined temperature threshold; and determining whether the operating temperature of the first communications unit exceeds the predetermined temperature threshold; in response to a determination that the operating temperature of the first communications unit exceeds the predetermined temperature threshold, detecting an operating temperature of a second communications unit; comparing the operating temperature of the second communications unit to the predetermined temperature threshold; and in response to a determination that the operating temperature of the second communications unit does not exceed the predetermined temperature threshold, switching the first call in process on the first communications unit from a first transceiver chain in the first communications unit to a second transceiver chain in a second communications unit.

According to various embodiments there is provided a non-transitory computer readable medium having stored therein a program for making a processor execute a method for mitigating temperature rise in a wireless communication device. The program may include processor executable instructions for: detecting an operating temperature of a first communications unit conducting a first call in process; comparing the operating temperature of the first communications unit to a predetermined temperature threshold; and determining whether the operating temperature of the first communications unit exceeds the predetermined temperature threshold; in response to a determination that the operating temperature of the first communications unit exceeds the predetermined temperature threshold, detecting an operating temperature of a second communications unit; comparing the operating temperature of the second communications unit to the predetermined temperature threshold; and in response to a determination that the operating temperature of the second communications unit does not exceed the predetermined temperature threshold, switching the first call in process on the first communications unit from a first transceiver chain in the first communications unit to a second transceiver chain in a second communications unit.

According to various embodiments there is provided a wireless communication device. The wireless communication device may include: means for detecting an operating temperature of a first communications unit conducting a first call in process; means for comparing the operating temperature of the first communications unit to a predetermined threshold temperature; means for determining whether the operating temperature of the first communications unit exceeds the predetermined threshold temperature; means for detecting an operating temperature of a second communications unit in response to a determination that the operating temperature of the first communications unit exceeds the predetermined threshold temperature; means for comparing the operating temperature of the second communications unit to the predetermined threshold temperature; and means for switching the first call in process on the first communications unit from a first transceiver chain in the first communications unit to a second transceiver chain in the second communications unit in response to a determination that the operating temperature of the second communications unit does not exceed the predetermined threshold temperature.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Various embodiments of the present inventive concept provide software-based methods to mitigate temperature rise at the power amplifier of a wireless communication device using an available second transceiver chain and temperature sensors in a DSDA wireless communication device.

When power amplifier operating temperature exceeds a predetermined threshold temperature during a call on one subscription, the call may be switched from a transceiver chain in use to the other transceiver chain. If calls on both subscriptions are active, the transceiver chain switching occurs if a transceiver chain processing a call on one subscription transmits at lower power and/or lower temperature than the transceiver chain processing a call on the other subscription.

Transceiver chain switching is accomplished in the digital domain, i.e., the digital signals to and from the modems are rerouted. Unlike an antenna radio frequency (RF) switch, switching the digital signals according to the various embodiments of the disclosure minimizes power loss.

Figure 1:
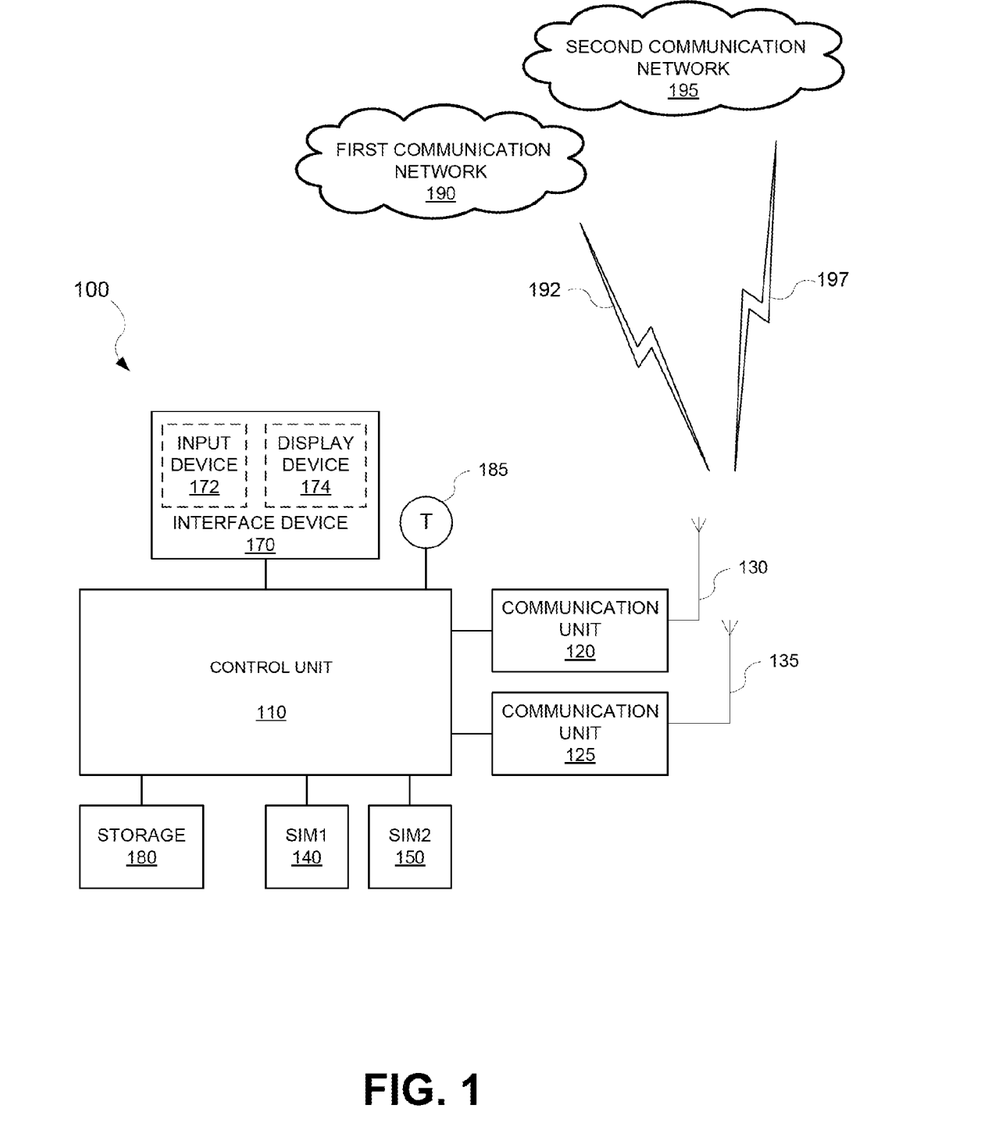
FIG. 1 is a block diagram illustrating a DSDA wireless communication device according to various embodiments of the disclosure.

FIG. 1 is a block diagram illustrating a DSDA wireless communication device 100 (also referred to herein as a wireless communication device) according to various embodiments of the disclosure. As illustrated in FIG. 1, the wireless communication device 100 may include a control unit 110, a first communications unit 120, a second communications unit 125, a first antenna 130, a second antenna 135, a first subscriber identity module (SIM) 140, a second SIM 150, a user interface device 170, a storage 180, and one or more temperature sensors 185.

The wireless communication device 100 may be, for example but not limited to, a mobile telephone, smartphone, tablet, computer, etc., capable of communicating with one or more wireless networks. One of ordinary skill in the art will appreciate that the wireless communication device 100 may include one or more communications units and may transmit and receive via one or more antennas without departing from the scope of the present inventive concept.

A SIM (e.g., 140, 150) in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the multi-SIM, Multi-Active (MSMA) communication device, and thus need not be a separate or removable circuit, chip, or card.

A SIM used in various embodiments may store user account information, an International Mobile Subscriber Identity (IMSI), a set of SIM application toolkit (SAT) commands and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Mobile Network (HPLMN) code, etc.) to indicate the SIM card network operator provider.

The first SIM 140 may associate the first communications unit 120 with a first subscription (Sub1) 192 on a first communication network 190 and the second SIM 150 may associate the second communications unit 125 with a second subscription (Sub2) 197 on a second communication network 195. In active mode, a communications unit receives and transmits signals. In idle mode, a communications unit may receive signals but does not transmit signals.

For convenience, throughout this disclosure Sub1 192 is associated with the first communications unit 120 and Sub 2 197 is associated with the second communications unit 125. One of ordinary skill in the art will appreciate that either subscription may be associated with either communications unit without departing from the scope of the present inventive concept.

The first communication network 190 and the second communication network 195 may be operated by the same or different service providers, and/or may support the same or different communication technologies, for example, but not limited to, Wideband Code Division Multiple Access (WCDMA) and Global System for Mobile communications (GSM).

The user interface device 170 may include an input device 172, for example, but not limited to a keyboard, touch panel, or other human interface device, and a display device 174, for example, but not limited to, a liquid crystal display (LCD) or other video display. One of ordinary skill in the art will appreciate that other input and/or display devices may be used without departing from the scope of the present inventive concept.

The control unit 110 may control overall operation of the wireless communication device 100 including control of the first communications unit 120, the second communications unit 125, the user interface device 170, and the storage 180. The control unit 110 may be a programmable device, for example, but not limited to, a microprocessor or microcontroller.

The storage 180 may store application programs necessary for operation of the wireless communication device 100 that are executed by the control unit 110, as well as application data and user data.

The one or more temperature sensors 185 may be positioned within an enclosure of the wireless communication device 100 to sense temperature of the enclosure and/or operating temperature of the electronic circuitry of the wireless communication device 100. The one or more temperature sensors 185 may provide temperature signals corresponding to the sensed temperatures to the control unit 110. While only one temperature sensor 185 is illustrated, one of ordinary skill in the art will appreciate that more than one temperature sensor may be used.

Figure 2A:
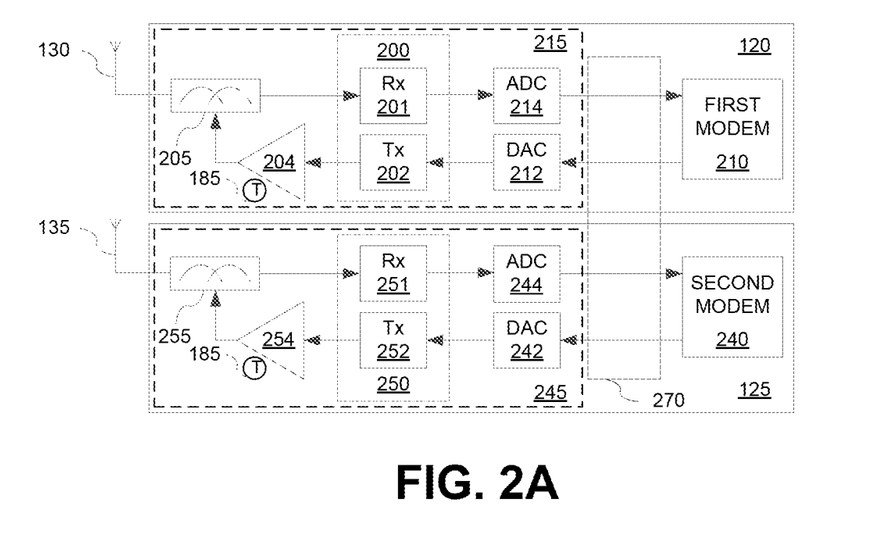
FIG. 2A is a block diagram illustrating a first communications unit and a second communications unit for a DSDA wireless communication device according to various embodiments of the disclosure.

FIG. 2A is a block diagram illustrating the first communications unit 120 and the second communications unit 125 for a DSDA wireless communication device (e.g., the wireless communication device 100 of FIG. 1) according to various embodiments of the disclosure. With reference to FIGS. 1 and 2A, the first communications unit 120 may include a first modem 210, and a first transceiver chain 215 including a first transceiver 200, a first analog-to-digital converter (ADC) 214, a first digital-to-analog converter (DAC) 212, a first power amplifier 204, and a first bandpass filter 205.

The first transceiver 200 may include a first receiving unit 201 configured to receive RF signals on the first antenna 130, and a first transmitting unit 202 configured to transmit RF signals on the first antenna 130. The first ADC 214 may be configured to convert an analog signal received from the first receiving unit 201 into a digital signal for processing by the first modem 210. The first DAC 212 may be configured to convert a digital signal received from the first modem 210 into an analog signal for transmission by the first transmitting unit 202.

The first power amplifier 204 may be configured to receive and amplify the analog signal from the first transmitting unit 202. The first bandpass filter 205 may be configured to receive and filter the amplified analog signal in the required frequency range for transmission.

The first modem 210 may be capable of processing signals from various radio access technologies, for example, but not limited to, WCDMA and/or GSM.

The second communications unit 125 may include a second modem 240, and a second transceiver chain 245 including a second transceiver 250, a second analog-to-digital converter (ADC) 244, a second digital-to-analog converter (DAC) 242, a second power amplifier 254, and a second bandpass filter 255.

The second transceiver 250 may include a second receiving unit 251 configured to receive RF signals on the second antenna 135, and a second transmitting unit 252 configured to transmit RF signals on the second antenna 135. The second ADC 244 may be configured to convert an analog signal received from the second receiving unit 251 into a digital signal for processing by the second modem 240. The second DAC 242 may be configured to convert a digital signal received from the second modem 240 into an analog signal for transmission by the second transmitting unit 252.

The second power amplifier 254 may be configured to receive and amplify the analog signal from the second transmitting unit 252. The second bandpass filter 255 may be configured to receive and filter the amplified analog signal in the required frequency range for transmission.

The second modem 240 may be capable of processing signals from various radio access technologies, for example, but not limited to, WCDMA and/or GSM.

At least one of the one or more temperature sensors 185 may be disposed at a location to sense an operating temperature of the first power amplifier 204, and at least one of the one or more temperature sensors 185 may be disposed at a location to sense an operating temperature of the second power amplifier 254.

Each of the first communications unit 120 and the second communications unit 125 may include band-specific amplifiers (not shown) to provide additional signal amplification. When band-specific amplifiers are included, the one or more temperature sensors 185 may be disposed at a location to sense operating temperatures of the band-specific amplifiers.

In various example embodiments, the wireless communication device 100 may further include an addressable switch matrix 270, for example, but not limited to a bridge, controlled by the control unit 110. The addressable switch matrix 270 may be connected to and configured to address the first ADC 214 and the second ADC 244, the first DAC 212 and the second DAC 242, and the first modem 210 and the second modem 240. Each of the components connected to the addressable switch matrix 270 may be addressed and connected via software by the control unit 110.

One of ordinary skill in the art will appreciate that other elements of the wireless communication device 100 may be connected to and addressed by the addressable switch matrix 270 without departing from the scope of the present inventive concept.

Referring to FIGS. 1 and 2A, the addressable switch matrix 270 may be configured by the control unit 110 to connect the first modem 210 to the first ADC 214 and the first DAC 212, and to connect the second modem 240 to the second ADC 244 and the second DAC 242. A call received on Sub1 192 associated with the first communications unit 120 will be processed by the first modem 210 using the first ADC 214 and the first DAC 212. Similarly, a call received on Sub2 197 associated with the second communications unit 125 will be processed by the second modem 240 using the second ADC 244 and the second DAC 242.

If a first call in process on the first communications unit 120 experiences a condition causing the wireless communication device 100 to transmit signals at a high power level, for example, but not limited to, high signal path loss between the base station and the wireless communication device 100, the wireless communication device 100 may transmit at a high power level. The high power transmission level may result in an operating temperature rise of the first power amplifier 204 of the first communications unit 120. The rise in operating temperature of the first power amplifier 204 may be sensed by the one or more temperature sensors 185 disposed at one or more locations to detect operating temperature of the first power amplifier 204, and temperature signals from the one or more temperature sensors 185 may be provided to the control unit 110.

The control unit 110 may compare the first power amplifier 204 operating temperature determined from the temperature signal from the one or more temperature sensors 185 with a predetermined threshold temperature. The predetermined threshold temperature may be set to a predefined temperature, for example, an increase to within about 5° C. of a typical safe operating temperature of about 65° C. for the first power amplifier 204.

If the control unit 110 determines based on the comparison that the first power amplifier 204 operating temperature exceeds the predetermined threshold temperature and an operating temperature of the second power amplifier 254 sensed by the one or more temperature sensors 185 is lower than the operating temperature of the first power amplifier 204, the control unit 110 may cause the addressable switch matrix 270 to reconfigure the connections for the first modem 210 and the second modem 240. Accordingly, the first call in process on the first communications unit 120 may be switched from the first transceiver chain 215 in the first communications unit 120 to the second transceiver chain 245 in the second communications unit 125.

If the control unit 110 determines that the second communications unit 125 is conducting a second call in process, the second call in process on the second communications unit 125 may be switched from the second transceiver chain 245 in the second communications unit 125 to the first transceiver chain 215 in the first communications unit 120.

In various embodiments, multiple threshold temperature values may be set based on, for example, but not limited to, a safe operating temperature for human safety and/or an operating temperature that will minimize adverse effects on call quality/dropped calls. For example, a safe operating temperature for human safety may be set for an enclosure temperature of the wireless communication device 100 within a small range above human body temperature (37° C.), and/or a safe operating temperature that will minimize adverse effects on call quality/dropped calls may be set within a small range of power amplifier temperature above about 65° C. The temperature threshold for the power amplifier may vary depending on whether the temperature of the primary power amplifier, for example, the first power amplifier 204 or the second power amplifier 254, or the temperature of a band-specific amplifier (not shown) is being monitored. In other embodiments, other threshold temperature values may be implemented.

When band-specific amplifiers (not shown) are included in a transceiver chain, for example the first transceiver chain 215 and/or the second transceiver chain 245, the control unit 110 may compare operating temperatures of one or more of the band-specific amplifiers to one or more predetermined threshold temperatures in addition to or alternative to the comparison of power amplifier temperature to make a reconfiguration determination.

Figure 2B:
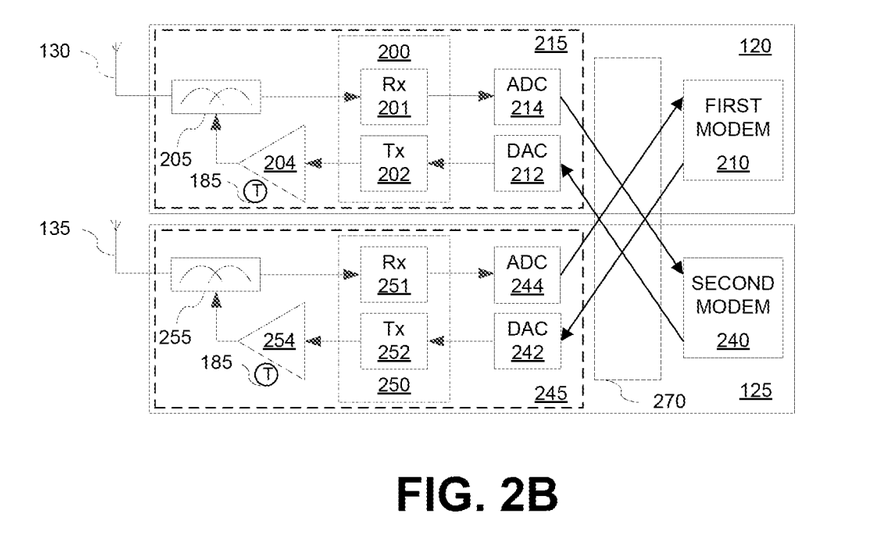
FIG. 2B is a block diagram illustrating a first communications unit and a second communications unit in a switched configuration for a DSDA wireless communication device according to various embodiments of the disclosure.

FIG. 2B is a block diagram illustrating the first communications unit 120 and the second communications unit 125 in a switched mode for a DSDA wireless communication device (e.g., 100 in FIG. 1) according to various embodiments of the disclosure. Referring to FIGS. 1, 2A, and 2B, the control unit 110 may cause the addressable switch matrix 270 to disconnect the first modem 210 of the first communications unit 120 from the first ADC 214 and the first DAC 212 and connect the first modem 210 of the first communications unit 120 with the second ADC 244 and the second DAC 242 of the second communications unit 125 and continue with the call on Sub1 192 using the second transceiver chain 245, including the second power amplifier 254, of the second communications unit 125 connected to the first modem 210 of the first communications unit 120. By continuing the call using the second transceiver chain 245 of the second communications unit 125 that is operating at a lower temperature, call quality may be improved and/or the call may be prevented from being dropped.

The control unit 110 may also cause the addressable switch matrix 270 to disconnect the second modem 240 of the second communications unit 125 from the second ADC 244 and the second DAC 242 and connect the second modem 240 of the second communications unit 125 with the first ADC 214 and the first DAC 212 of the first transceiver chain 215 of the first communications unit 120. Since prior to reconfiguration the second power amplifier 254 of the second transceiver chain 245 was operating at a lower temperature than the first power amplifier 204 of the first transceiver chain 215, either the second communications unit 125 may not have had a second call in process or a second call in process on the second communications unit 125 may not have required a transmission power level as high as the first call in process on the first communications unit 120. After reconfiguration a second call in process on the second communications unit 125 switched to the first communications unit 120 may maintain acceptable call quality and the first power amplifier 204 of the first transceiver chain 215 of the first communications unit 120 may be afforded the opportunity to cool down.

Figure 3:
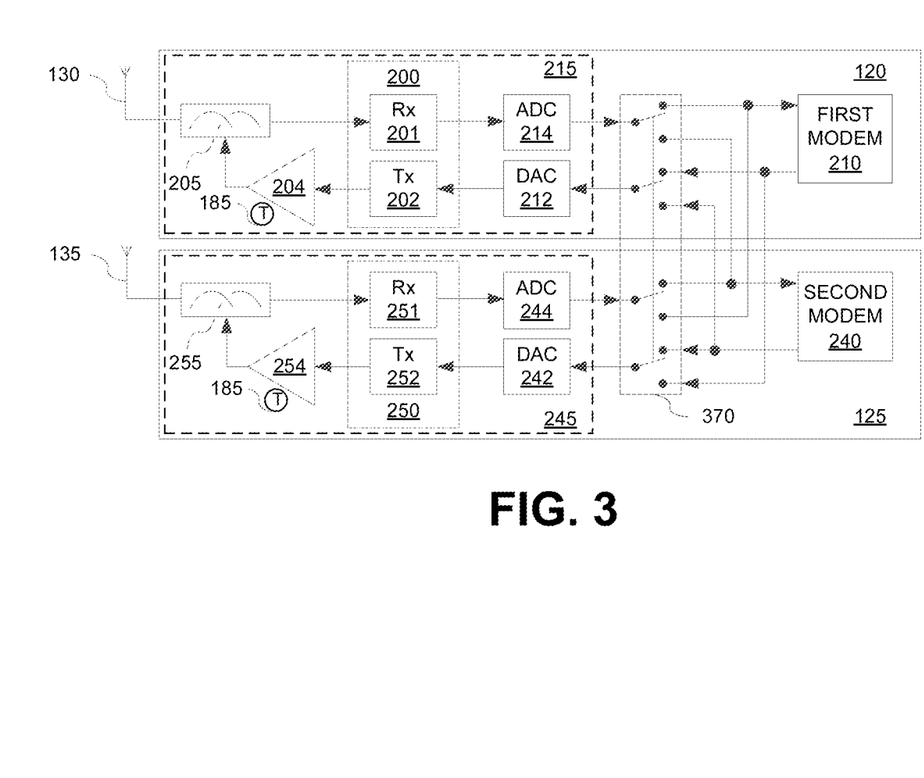
FIG. 3 is a block diagram illustrating a first communications unit, a second communications unit, and a switch unit for a DSDA wireless communication device according to various embodiments of the disclosure.

In various example embodiments, the wireless communication device 100 may include a switch unit 370 (which in some embodiments may correspond to the addressable switch matrix 270). FIG. 3 is a block diagram illustrating the first communications unit 120, the second communications unit 125, and the switch unit 370 for a DSDA wireless communication device (e.g., 100 in FIG. 1) according to various embodiments of the disclosure. Referring to FIGS. 1 and 3, switch unit 370 may be controlled by the control unit 110 to provide electrical connections between various elements of the wireless communication device 100. The first ADC 214 and the second ADC 244, the first DAC 212 and the second DAC 242, and the first modem 210 and the second modem 240 may be connected to the switch unit 370. One of ordinary skill in the art will appreciate that other elements of the wireless communication device 100 may be connected to the switch unit 370 without departing from the scope of the present inventive concept.

In a first position, the switch unit 370 may connect the first modem 210 to the first ADC 214 and the first DAC 212 in the first transceiver chain 215, and connect the second modem 240 to the second ADC 244 and the second DAC 242 in the second transceiver chain 245. If a first call in process on the first communications unit 120 experiences a condition causing the wireless communication device 100 to transmit signals at a high power level, for example, but not limited to, high signal path loss between the base station and the wireless communication device 100, the wireless communication device 100 may transmit at a high power level.

The high power transmission level may result in an operating temperature rise at the first power amplifier 204 of the first communications unit 120. The rise in operating temperature at the first power amplifier 204 may be sensed by the one or more temperature sensors 185 disposed at one or more locations to detect operating temperature of the first power amplifier 204 and a temperature signal from the one or more temperature sensors 185 may be provided to the control unit 110.

The control unit 110 may compare the first power amplifier 204 operating temperature determined from the temperature signal from the one or more temperature sensors 185 with a predetermined threshold temperature. The predetermined threshold temperature may be set to a predefined temperature, for example, an increase to within about 5° C. of a typical safe operating temperature of about 65° C. for the first power amplifier 204.

If the control unit 110 determines based on the comparison that the first power amplifier 204 operating temperature exceeds the predetermined threshold temperature and an operating temperature of the second power amplifier 254 sensed by the one or more temperature sensors 185 does not exceed the predetermined threshold temperature, the control unit 110 may cause the switch unit 370 to switch from the first position to a second position.

In the second position, the switch unit 370 may connect the first modem 210 to the second ADC 244 and the second DAC 242 in the second transceiver chain 245, and connect the second modem 240 to the first ADC 214 and the first DAC 212 in the first transceiver chain 215. The first call in process on Sub1 192 may be continued using the second transceiver chain 245, including the second power amplifier 254, of the second communications unit 125 connected to the first modem 210 of the first communications unit 120. By continuing the call using the second transceiver chain 245 of the second communications unit 125 that is operating at a lower temperature, call quality may be improved and/or the call may be prevented from being dropped.

The control unit 110 may also cause the switch unit 370 to connect the second modem 240 of the second communications unit 125 with the first ADC 214 and the first DAC 212 of the first transceiver chain 215 of the first communications unit 120. Since prior to reconfiguration the second power amplifier 254 of the second transceiver chain 245 was operating at a lower temperature than the first power amplifier 204 of the first transceiver chain 215, either the second communications unit 125 may not have had a second call in process or a second call in process on the second communications unit 125 may not have required a transmission power level as high as the first call in process on the first communications unit 120. After reconfiguration a second call in process on the second communications unit 125 switched to the first communications unit 120 may maintain acceptable call quality and the first power amplifier 204 of the first transceiver chain 215 of the first communications unit 120 may be cool down.

In addition to high signal path loss between the base station and the wireless communication device 100, other conditions known to those skilled in the art may cause the wireless communication device 100 to transmit at a high power level. One of ordinary skill in the art will appreciate that any condition causing the wireless communication device 100 to transmit at a high power level may result in the transceiver chain switching of the various example embodiments of the disclosure.

Figure 4:
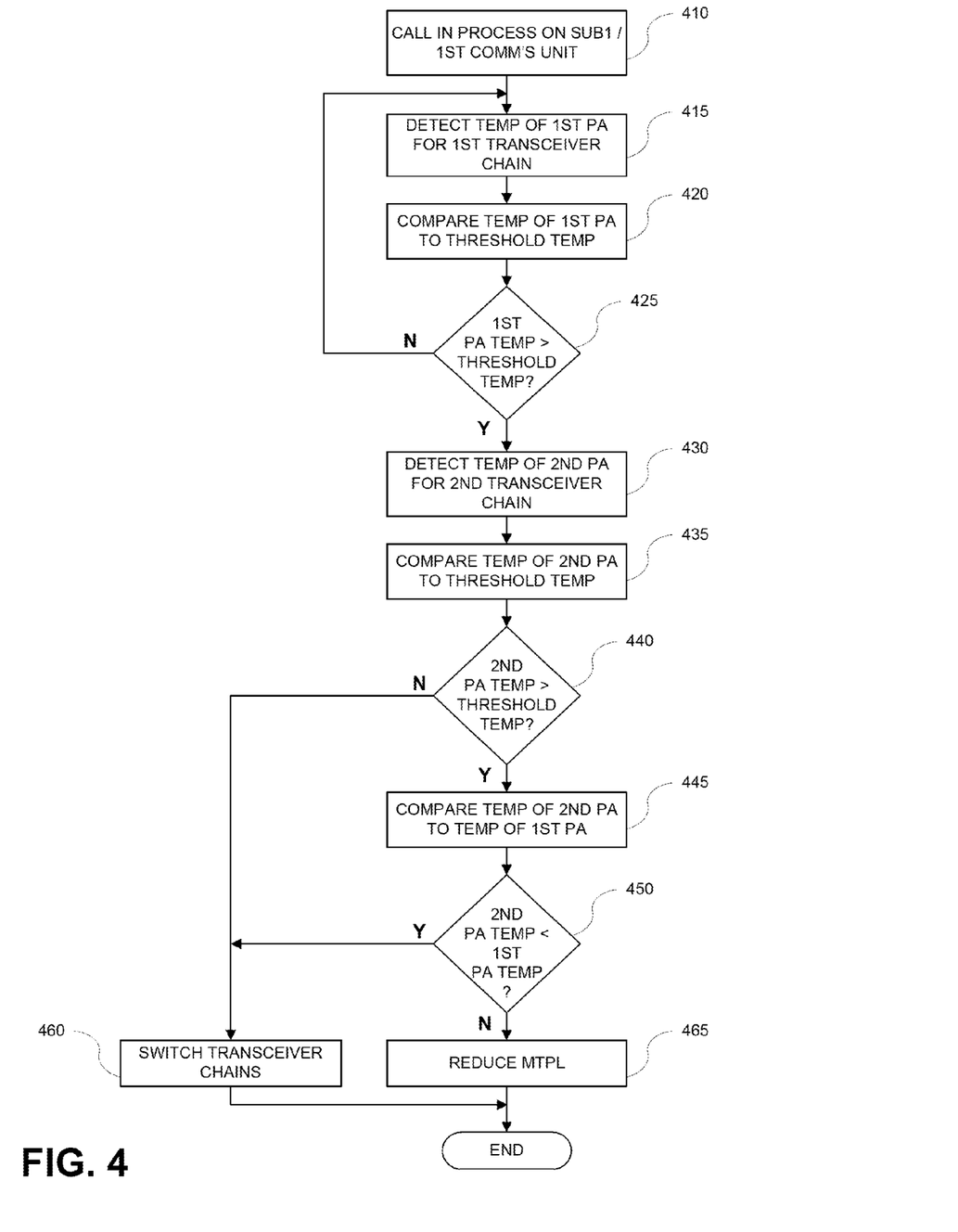
FIG. 4 is a method of controlling power amplifier operating temperature by switching transceiver chains in a DSDA wireless communication device according to various embodiments of the disclosure.

FIG. 4 is a method of controlling power amplifier operating temperature by switching transceiver chains in a DSDA wireless communication device (e.g., 100 in FIG. 1) according to various embodiments. Referring to FIGS. 1-4, when a call is active (in process) on Sub1 192 associated with a first communications unit 120 (410), the operating temperature of the first power amplifier 204 in the first transceiver chain 215 may be sensed by the one or more temperature sensors 185 disposed at a location to detect an operating temperature of the first power amplifier 204, and temperature signals from the one or more temperature sensors 185 may be provided to the control unit 110 (415).

The control unit 110 may compare the first power amplifier 204 operating temperature to a predetermined threshold temperature (420). If the control unit 110 determines based on the comparison that the first power amplifier 204 operating temperature does not exceed the predetermined threshold temperature (425-N) the control unit 110 may continue to monitor the operating temperature of the first power amplifier 204 (415). If the control unit 110 determines based on the comparison that the first power amplifier 204 operating temperature exceeds the predetermined threshold temperature (425-Y), the control unit 110 may detect the operating temperature of the second power amplifier 254 of the second transceiver chain 245 of the second communications unit 125 (430).

In some situations, when a call is in process on Sub2 197 on the second communications unit 125, the second power amplifier 254 may amplify signals for transmission and therefore may experience an operating temperature increase such that the operating temperature of the second power amplifier 254 exceeds the predetermined threshold temperature. In other situations, even when a call is in process on Sub2 197 on the second communications unit 125, the operating temperature of the second power amplifier 254 may not exceed the predetermined threshold temperature. Also, when a call is not in process on Sub2 197 on the second communications unit 125, the operating temperature of the second power amplifier 254 may not exceed the predetermined threshold temperature.

The control unit 110 may compare the operating temperature of the second power amplifier 254 of the second transceiver chain 245 to the predetermined threshold temperature (435). If the control unit 110 determines that the operating temperature of the second power amplifier 254 of the second transceiver chain 245 does not exceed the predetermined threshold temperature (440-N), the first transceiver chain 215 and the second transceiver chain 245 may be switched by connecting the first modem 210 of the first communications unit 120 with the second ADC 244 and the second DAC 242 of the second transceiver chain 245 of the second communications unit 125 (460). Accordingly, the call on Sub1 192 may be continued using the second transceiver chain 245 connected to the first modem 210. In addition, the second modem 240 of the second communications unit 125 may be connected with the first ADC 214 and the first DAC 212 of the first transceiver chain 215 of the first communications unit 120, thereby switching the first transceiver chain 215 and the second transceiver chain 245 (460).

If the control unit 110 determines that the operating temperature of the second power amplifier 254 of the second transceiver chain 245 exceeds the predetermined threshold temperature (440-Y), the control unit 110 may compare the operating temperature of the second power amplifier 254 of the second transceiver chain 245 to the operating temperature of the first power amplifier 204 of the first transceiver chain 215 (445). If the operating temperature of the second power amplifier 254 of the second transceiver chain 245 is lower than the operating temperature of the first power amplifier 204 of the first transceiver chain 215 (450-Y), the first transceiver chain 215 and the second transceiver chain 245 may be switched (460).

If the operating temperature of the second power amplifier 254 of the second transceiver chain 245 is not lower (i.e., is equal to or greater than) than the operating temperature of the first power amplifier 204 of the first transceiver chain 215 (450-N), the maximum transmit power limit (MTPL) of the first transceiver chain 215 of the first communications unit 120 and/or the second transceiver chain 245 of the second communications unit 125 may be reduced (465).

Various embodiments relate to DSDA devices. It should be noted that the systems and methods described herein may be implemented in multi-SIM multi-active device.

In various example embodiments, method of controlling power amplifier operating temperature by switching transceiver chains in a DSDA wireless communication device may be embodied as non-transitory computer readable medium having stored therein a program containing instructions for making a processor execute the method.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies and having multiple communications units. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A wireless communication device, comprising:
a first communications unit configured to communicate with a first communication network;
a second communications unit configured to communicate with a second communication network;
a control unit configured to control operation of the wireless communication device; and
one or more temperature sensors configured to sense an operating temperature of the first communications unit and an operating temperature of the second communications unit and provide temperature signals to the control unit,
wherein in response to a determination that the operating temperature of the first communications unit conducting a first call in process exceeds a predetermined temperature threshold and the operating temperature of the second communications unit does not exceed the predetermined temperature threshold, the control unit is configured to cause the first call in process on the first communications unit to be switched from a first transceiver chain in the first communications unit to a second transceiver chain in the second communications unit.

2. The wireless communication device according to claim 1, wherein in response to a determination by the control unit that the second communications unit is conducting a second call in process, the control unit is configured to cause the second call in process on the second communications unit to be switched from the second transceiver chain in the second communications unit to the first transceiver chain in the first communications unit.

3. The wireless communication device according to claim 1, wherein in response to a determination that the operating temperature of the first communications unit conducting the first call in process on the first communications unit exceeds the predetermined temperature threshold, the operating temperature of the second communications unit exceeds the predetermined temperature threshold, and the operating temperature of the second communications unit is less than the operating temperature of the first communications unit, the control unit is configured to cause the first call in process on the first communications unit to be switched from the first transceiver chain in the first communications unit to the second transceiver chain in the second communications unit.

4. The wireless communication device according to claim 3, wherein in response to a determination by the control unit that the second communications unit is conducting a second call in process, the control unit is configured to cause the second call in process on the second communications unit to be switched from the second transceiver chain in the second communications unit to the first transceiver chain in the first communications unit.

5. The wireless communication device according to claim 1,
wherein the first communications unit comprises a first modem and the first transceiver chain comprises a first power amplifier, a first analog-to-digital converter (ADC), and a first digital-to-analog converter (DAC); and
wherein the second communications unit further comprises a second modem and the second transceiver chain comprises a second power amplifier, a second ADC, and a second DAC.

6. The wireless communication device according to claim 5, wherein the one or more temperature sensors configured to sense the operating temperature of the first communications unit and the operating temperature of the second communications unit are configured to sense an operating temperature of the first power amplifier and an operating temperature of the second power amplifier.

7. The wireless communication device according to claim 5, further comprising an addressable switch matrix configured to address one or more of the first modem, the second modem, the first transceiver chain, and the second transceiver chain.

8. The wireless communication device according to claim 7, wherein the addressable switch matrix, in response to instructions from the control unit, is configured to cause the first modem conducting the first call in process on the first communications unit to disconnect from the first transceiver chain and connect to the second transceiver chain to continue the first call in process.

9. The wireless communication device according to claim 8, wherein the addressable switch matrix, in response to instructions from the control unit, is configured to cause the second modem to disconnect from the second transceiver chain and connect to the first transceiver chain.

10. The wireless communication device according to claim 7, wherein the addressable switch matrix, in response to instructions from the control unit, is configured to cause the first modem to disconnect from the first ADC and the first DAC and connect to the second ADC and the second DAC, and is configured to cause the second modem to disconnect from the second ADC and the second DAC and connect to the first ADC and the first DAC.

11. The wireless communication device according to claim 5, further comprising a switch unit configured to, in response to instructions from the control unit,
disconnect the first modem from the first ADC and the first DAC, and connect the first modem to the second ADC and the second DAC.

12. The wireless communication device according to claim 11, wherein the switch unit is configured to, in response to instructions from the control unit, disconnect the second modem from the second ADC and the second DAC, and connect the second modem to the first ADC and the first DAC.

13. A method for mitigating temperature rise in a wireless communication device, the method comprising:
detecting an operating temperature of a first communications unit conducting a first call in process;
comparing the operating temperature of the first communications unit to a predetermined threshold temperature;
determining whether the operating temperature of the first communications unit exceeds the predetermined threshold temperature;
in response to a determination that the operating temperature of the first communications unit exceeds the predetermined threshold temperature, detecting an operating temperature of a second communications unit;
comparing the operating temperature of the second communications unit to the predetermined threshold temperature; and
in response to a determination that the operating temperature of the second communications unit does not exceed the predetermined threshold temperature, switching the first call in process on the first communications unit from a first transceiver chain in the first communications unit to a second transceiver chain in the second communications unit.

14. The method according to claim 13, further comprising:
determining whether the second communications unit is conducting a second call in process; and
in response to a determination that the second communications unit is conducting a second call in process, switching the second call in process on the second communications unit from the second transceiver chain in the second communications unit to the first transceiver chain in the first communications unit.

15. The method according to claim 13, further comprising:
comparing the operating temperature of the second communications unit to the operating temperature of the first communications unit; and
in response to a determination that the operating temperature of the first communications unit exceeds the predetermined temperature threshold and the operating temperature of the second communications unit is less than the operating temperature of the first communications unit, switching the first call in process on the first communications unit from the first transceiver chain in the first communications unit to the second transceiver chain in the second communications unit.

16. The method according to claim 15, further comprising:
in response to a determination that the second communications unit is conducting a second call in process, switching the second call in process on the second communications unit from the second transceiver chain in the second communications unit to the first transceiver chain in the first communications unit.

17. The method according to claim 13, wherein detecting the operating temperature of the first communications unit comprises detecting an operating temperature of a first power amplifier, and detecting the operating temperature of the second communications unit comprises detecting an operating temperature of a second power amplifier.

18. The method according to claim 13, wherein switching the first call in process from the first transceiver chain in the first communications unit to the second transceiver chain in the second communications unit comprises:
disconnecting a first modem of the first communications unit from a first analog-to-digital converter (ADC) and a first digital-to-analog converter (DAC) of the first communications unit; and
connecting the first modem of the first communications unit to the second ADC and the second DAC of the second communications unit.

19. The method according to claim 18, wherein switching the first call in process from the first transceiver chain in the first communications unit to the second transceiver chain in the second communications unit comprises:
disconnecting a second modem of the second communications unit from a second ADC and a second DAC of the second communications unit; and
connecting the second modem of the second communications unit to the first ADC and the first DAC of the first communications unit.

20. A non-transitory computer readable medium having stored therein a program for making a processor execute a method for mitigating temperature rise in a wireless communication device, the program including processor executable instructions for performing steps comprising:
detecting an operating temperature of a first communications unit conducting a first call in process;
comparing the operating temperature of the first communications unit to a predetermined threshold temperature;

determining whether the operating temperature of the first communications unit exceeds the predetermined threshold temperature;

in response to a determination that the operating temperature of the first communications unit exceeds the predetermined threshold temperature, detecting an operating temperature of a second communications unit;

comparing the operating temperature of the second communications unit to the predetermined threshold temperature; and in response to a determination that the operating temperature of the second communications unit does not exceed the predetermined threshold temperature, switching the first call in process on the first communications unit from a first transceiver chain in the first communications unit to a second transceiver chain in the second communications unit.

21. The non-transitory computer readable medium having stored therein a program as defined in claim 20, the program further comprising processor executable instructions for:

determining whether the second communications unit is conducting a second call in process; and in response to a determination that the second communications unit is conducting a second call in process, switching the second call in process on the second communications unit from the second transceiver chain in the second communications unit to the first transceiver chain in the first communications unit.

22. The non-transitory computer readable medium having stored therein a program as defined in claim 20, the program further comprising processor executable instructions for:

comparing the operating temperature of the second communications unit to the operating temperature of the first communications unit; and in response to a determination that the operating temperature of the first communications unit exceeds the predetermined threshold temperature and the operating temperature of the second communications unit is less than the operating temperature of the first communications unit, switching the first call in process on the first communications unit from the first transceiver chain in the first communications unit to the second transceiver chain in the second communications unit.

23. The non-transitory computer readable medium having stored therein a program as defined in claim 22, the program further comprising processor executable instructions for:

in response to a determination that the second communications unit is conducting a second call in process, switching the second call in process on the second communications unit from the second transceiver chain in the second communications unit to the first transceiver chain in the first communications unit.

24. The non-transitory computer readable medium having stored therein a program as defined in claim 20, wherein detecting the operating temperature of the first communications unit comprises processor executable instructions for detecting an operating temperature of a first power amplifier, and detecting the operating temperature of the second communications unit comprises detecting an operating temperature of a second power amplifier.

25. The non-transitory computer readable medium having stored therein a program as defined in claim 20, wherein switching the first call in process on the first communications unit from the first transceiver chain in the first communications unit to the second transceiver chain in the second communications unit comprises processor executable instructions for:

disconnecting a first modem of the first communications unit from a first analog-to-digital converter (ADC) and a first digital-to-analog converter (DAC) of the first communications unit; and connecting the first modem of the first communications unit to the second ADC and the second DAC of the second communications unit.

26. The non-transitory computer readable medium having stored therein a program as defined in claim 25, wherein switching the first call in process on the first communications unit from the first transceiver chain in the first communications unit to the second transceiver chain in the second communications unit comprises processor executable instructions for:

disconnecting a second modem of the second communications unit from a second ADC and a second DAC of the second communications unit; and connecting the second modem of the second communications unit to the first ADC and the first DAC of the first communications unit.

27. A wireless communication device, comprising:

means for detecting an operating temperature of a first communications unit conducting a first call in process;

means for comparing the operating temperature of the first communications unit to a predetermined threshold temperature;

means for determining whether the operating temperature of the first communications unit exceeds the predetermined threshold temperature;

means for detecting an operating temperature of a second communications unit in response to a determination that the operating temperature of the first communications unit exceeds the predetermined threshold temperature;

means for comparing the operating temperature of the second communications unit to the predetermined threshold temperature; and means for switching the first call in process on the first communications unit from a first transceiver chain in the first communications unit to a second transceiver chain in the second communications unit in response to a determination that the operating temperature of the second communications unit does not exceed the predetermined threshold temperature.

* * * * *